United States Patent
Hazen

[15] 3,645,137
[45] Feb. 29, 1972

[54] QUARTZ PRESSURE SENSOR

[72] Inventor: Edward J. Hazen, Woodcliff Lake, N.J.
[73] Assignee: The Bendix Corporation
[22] Filed: Apr. 16, 1970
[21] Appl. No.: 29,222

[52] U.S. Cl. ............................................73/398 C, 73/407
[51] Int. Cl. .............................................................G01l 9/12
[58] Field of Search ............73/398 C, 398 R, 407; 317/246, 317/249

[56] References Cited

UNITED STATES PATENTS

| | | | |
|---|---|---|---|
| 2,808,545 | 10/1957 | Hirtreiter | 73/398 C |
| 3,405,559 | 10/1968 | Moffatt | 73/398 C |
| 2,482,440 | 9/1949 | Rysky | 73/398 C |

Primary Examiner—Donald O. Woodiel
Attorney—Plante, Arenz, Hartz, Smith and Thompson

[57] ABSTRACT

A pair of identical quartz elements each having a end wall and a sidewall are disposed in an opening through an outer quartz member so that the end walls are opposed and spaced from each other. A portion of the sidewalls of each element are secured to the outer member to define an inner space between the elements and the outer member. Capacitor plates are formed on the opposed surfaces of the end walls to form a capacitor. Each plate has a conductor connected thereto which extends through a seal in the sidewall. The outer member has an opening extending to the inner space and a capillary tube is attached to the opening. The space and a portion of the capillary tube are filled with a liquid having a known dielectric constant. A first pressure is applied to the opposing surfaces of the end walls through the capillary tube and a second pressure is applied to the other surface of each end wall so that the end walls flex in response to the pressures and the capacitance between the plates corresponds to the difference between the first and second pressures.

14 Claims, 4 Drawing Figures

INVENTOR.
EDWARD J. HAZEN

BY

AGENT

INVENTOR.
EDWARD J. HAZEN

AGENT

QUARTZ PRESSURE SENSOR

BACKGROUND OF THE INVENTION

1. Field of the Invention

This invention relates to pressure sensors and more particularly to pressure sensors having flexible members.

2. Description of the Prior Art

Heretofore, conventional pressure sensors comprised an area member such as a metallic diaphragm or bellows exposed to a pressure which developed a force thereon and deflected the member. The deflection was sensed by a mechanical transducing means such as a synchro or a potentiometer that provided an electrical signal corresponding to the deflection.

More recently pressure sensors have been fabricated from silicon or quartz and used strain gauges or capacitance pickoff devices to detect the deflection of the silicon or quartz members. These devices were fabricated in several configurations; however, all the configurations of the prior art were acceleration sensitive and errors were introduced during periods when the sensor was subjected to acceleration.

When a pressure sensor was used to measure a differential pressure, one pressure was exerted on the exterior of the sensor and a second pressure was applied to the interior. When a capacitance pickoff was used the capacitor plates were mounted inside the sensor so that the capacitance between the plates was dependent upon the dielectric constant of the medium between the plates. Generally the atmosphere of the second pressure was present between the plates and the humidity and contaminants therein would vary the dielectric constant and cause considerable variations in the capacitance resulting in undesirable errors. Various means were used to eliminate the moisture, one of which was to use a desiccant; however, this required periodic maintenance to replace the desiccant. Another method was to fill the space between the plates with a liquid having a stable dielectric constant; however, this required a flexible means to separate the liquid from the atmosphere of the second pressure and retain the liquid within the sensor. A diaphragm or bellows was usually used, however, these devices introduced errors because of their variable spring rates.

The devices of the prior art were not satisfactory when high accuracies were required, or when low pressures were to be measured.

SUMMARY OF THE INVENTION

The present invention contemplates a pressure sensor constructed entirely of quartz and having a capacitance pickoff. Two identical quartz elements each having a bottom wall or end and a side wall are inserted into a hollow quartz outer member so that the bottom walls are opposed and spaced from each other. A portion of the side walls of each element are heat sealed to the outer member to define an inner space between the elements and the outer member. The opposed surfaces of the bottom walls each have a capacitor plate fixed thereon and a conductor connected to the plate extending through a seal in the sidewall. The seals in the sidewalls are formed at a sufficient distance from the bottom walls to prevent changes in the characteristics of the quartz bottoms when the seals are formed.

For use as an absolute pressure sensor the inner space is evacuated and the bottom walls are exposed to a pressure causing the bottoms to flex by an amount corresponding to the pressure, thereby varying the distance between the capacitor plates and the capacitance therebetween. Thus the sensor provides a capacitor the capacitance of which varies in corresponding relationship to the pressure applied to the bottom walls.

The sensor is not sensitive to acceleration because the capacitor plates are mounted on identical quartz members and acceleration affects both members equally, so that the distance between the plates is a function of pressure only and not acceleration. The sensor is unaffected by temperature because of the unique stable temperature characteristics of quartz.

The sensor is adapted for measuring differential pressures by forming an opening in the outer member extending to the inner space and by connecting a capillary tube thereto. A portion of the tube and the inner space is filled with a liquid having a stable dielectric constant thereby eliminating humidity and contaminants from the medium between the capacitor plates. A first pressure is exerted on the opposing surfaces of the bottom walls through the capillary tube and the liquid and a second pressure is applied to the other surface of each bottom wall so that the bottom walls flex in response to the pressures and the capacitance between the plates changes in corresponding relation to the difference between the first and second pressures. The capillary tube allows for expansion and contraction of the liquid due to temperature changes and for changes in volume of the inner space because of flexure of the bottom walls. The capillary tube acts in conjunction with the surface tension of the liquid to retain the liquid within the sensor. Use of the capillary tube eliminates variable errors introduced by the spring rate of the diaphragm or bellows used in the prior art.

One object of the present invention is to provide a pressure sensor insensitive to acceleration.

Another object is to provide a pressure sensor uneffected by temperature and humidity.

Another object of the invention is to provide a differential pressure sensor having a capacitance pickoff not effected by contaminants or humidity in the atmosphere of the sensed pressure.

Another object is to provide a pressure sensor more accurate and reliable than those heretofore available.

The foregoing and other objects and advantages of the invention will appear more fully hereinafter from a consideration of the detailed description which follows taken together with the accompanying drawings wherein two embodiments of the invention are illustrated by way of example. It is expressly understood, however, that the drawings are for illustration purposes only and are not to be construed as defining the limits of the invention.

DESCRIPTION OF THE INVENTION

Figure 1:
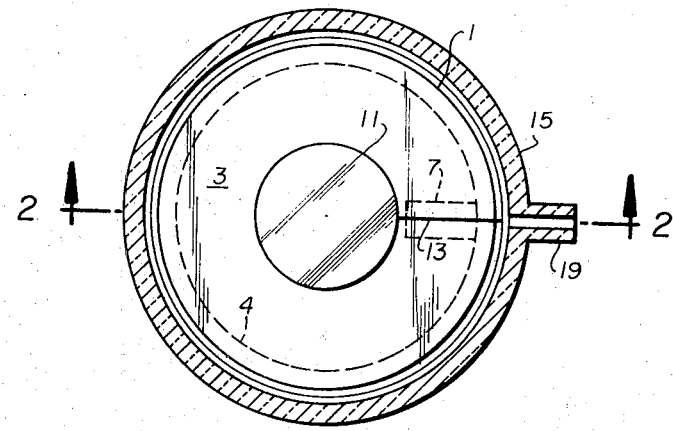
FIG. 1 is a horizontal section taken on line 1—1 of FIG. 2 of a pressure sensor constructed in accordance with the present invention.
Figure 2:
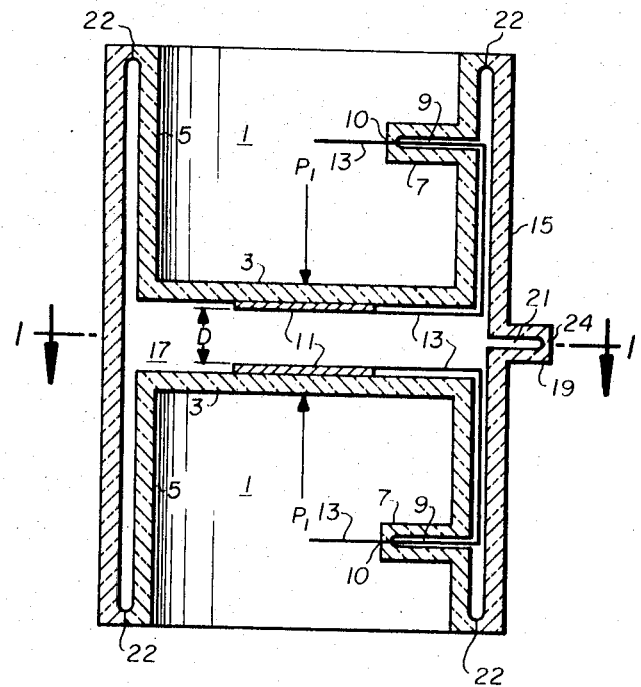
FIG. 2 is a vertical section taken along lines 2—2 of FIG. 1.
Figure 3:
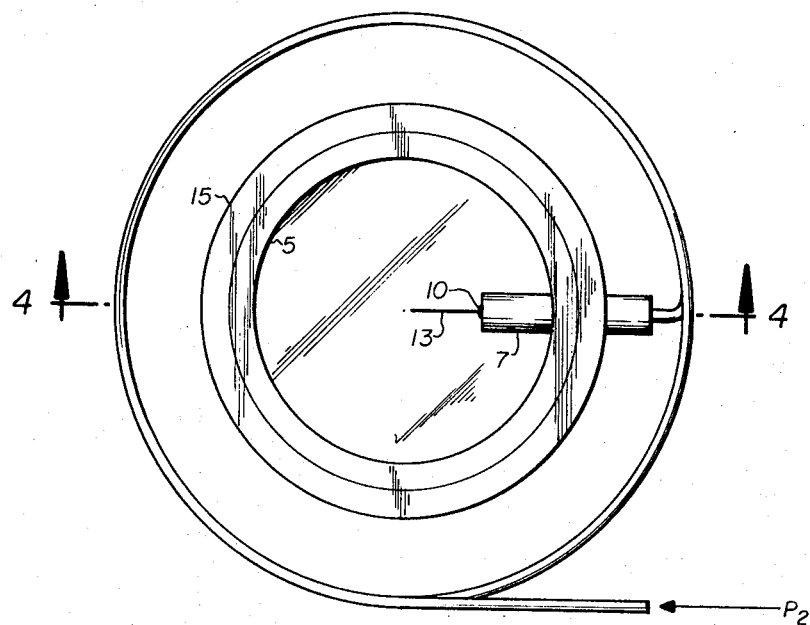
FIG. 3 is a top view of another embodiment of the present invention.
Figure 4:
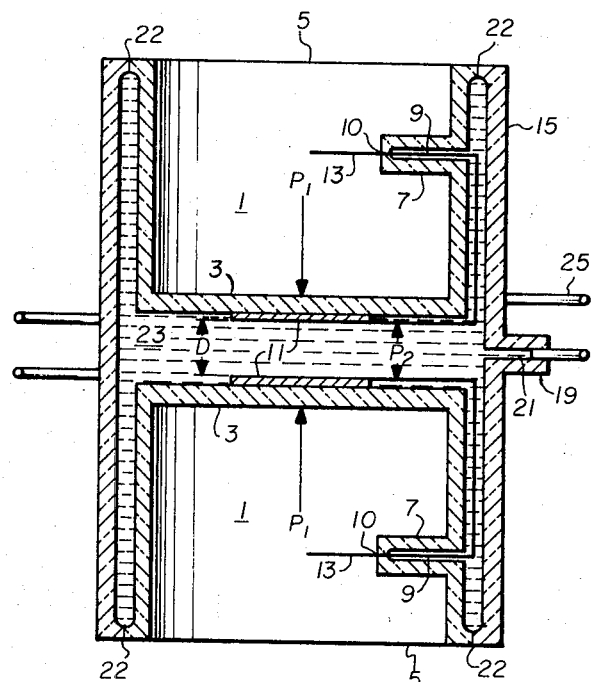
FIG. 4 is a vertical section taken along line 4—4 of FIG. 3.

Referring to FIGS. 1 and 2 there is shown an absolute pressure sensor for measuring a pressure $P_1$. A pair of identical quartz elements 1 have thin flexible bottom walls 3 and sidewalls 5 forming hollow cylinders having one end closed. It is desirable but not essential that the height of the sidewalls equal one-half the width of the bottom, the reason for this will be explained subsequently. On the sidewall of each element 1 is formed an inwardly projecting tube 7 having an opening 9 extending therethrough. On one surface of the bottom wall of each element 1 is mounted a plate 11 having a conductor 13 leading therefrom and extending through the opening 9 in tube 7. Openings 9 in tubes 7 are heat sealed at 10 in a manner well known in the art. The plates 11 may be formed on the surfaces of bottoms 3 by plating or painting a conductive material thereon.

A quartz member 15 has a first opening therethrough sufficiently large to receive members 1 and an outwardly projecting tube 19 having a second opening 21 extending therethrough and continuing to the first opening. Elements 1 are inserted into member 15 so that the plates 11 are opposed and separated by a distance D sufficient to form a capacitor. Sidewalls 5 are sealed near their edges at 22 to member 15 by heat sealing to define an inner space 17. Space 17 is evacuated through tube 19 which is then heat sealed at 24.

Conductors 13 are connected to an external circuit for detecting the capacitance of the capacitor formed by plates 11. Such a circuit may be a tuned circuit the frequency of which is determined by the capacitance of the capacitor.

In operation the bottom walls 3 are subjected to pressure $P_1$ which develops a force that flexes the bottom walls thereby varying the distance D by an amount corresponding to the pressure. The capacitance of the capacitor formed by plates 11 varies in corresponding relation with distance D and therefore corresponds to pressure $P_1$.

Quartz has extremely stable temperature characteristics and low-hysteresis effects. Therefore the sensor does not experience hysteresis errors or appreciable errors caused by temperature variations.

In prior art devices errors were caused by acceleration because the elements on which the plates were mounted were of different sizes and weights so that acceleration caused them to flex different amounts thereby changing the distance D. Acceleration errors are eliminated or greatly reduced in the present invention because elements 1 are identical and the bottom walls have equal areas and mass. Acceleration has identical effects on both bottom walls and they flex equal amounts so that distance D is a function of pressure only.

Use of identical elements arranged as shown eliminates the need for a foreign sealing substance or the application of heat near the flexible area thus eliminating changes in the quartz characteristics. Since the seals at 22 are formed near the edges of sidewalls 5 they are sufficiently far from the bottom walls so that the flexible areas are not affected by the sealing heat.

The configuration of the sensor is particularly adapted to easy assembly. Each element may be separately assembled with the capacitor plate mounted in place and the connector sealed in opening 9. Then the elements are inserted in member 15 and sealed therein to form the sensor.

When it is desirable to measure a difference between two pressures $P_1$ and $P_2$, inner space 17 is subjected to pressure $P_2$. The sensor of FIGS. 1 and 2 is modified in that the space 17 is not evacuated and opening 21 is not sealed. Pressure $P_2$ is applied to opening 21 and exerted on the opposing surfaces of the bottom walls to oppose pressure $P_1$ which is exerted on the other surface of each bottom wall. The resultant pressure acting on the bottom walls corresponds to the difference between pressure $P_1$ and $P_2$ and causes the bottoms to flex a corresponding amount so that distance D varies in corresponding relation to the differential pressure.

The capacitance between plates 11 is dependent upon the dielectric constant of the medium between the plates. When the medium is air, errors are introduced by variations of the dielectric constant due to humidity and contaminants in the air. To eliminate these errors inner space 17 is filled with liquid 23 having a stable dielectric constant, such as Dow Corning DC10 a silicon type liquid. It is to be understood that any other equivalent liquid may be used that has a stable dielectric.

Liquid 23 develops a pressure head and exerts a force on bottom walls 3 causing a slight flexure of the bottom walls; however, this flexure is substantially constant and not dependent upon sensor orientation. As was mentioned previously it is preferable that the height of sidewalls 5 be equal to one-half the width of the bottom walls 3. When the elements are designed in this manner the liquid height is always approximately the same distance above the center of the flexible bottom walls 3, making the effects of the pressure head substantially independent of sensor orientation.

A capillary tube 25 has one end connected to opening 21 of tube 19 and is partially filled with the liquid to assure that space 17 remains filled when the volume of space 17 changes because of the flexure of the bottom walls 3 and when the liquid expands or contracts because of temperature changes. Tube 25 must be sufficiently long to have a volume greater than the maximum change in volume of space 17 caused by deflection of bottom walls 3 and the maximum change in liquid volume caused by expansion or contraction due to temperature. Tube 25 is wrapped around member 15 to prevent a change in pressure head as the volume of liquid in the tube changes.

Pressure $P_2$ is applied to the other end of tube 25 and is transmitted through the liquid to exert a force on the opposing surfaces of bottom walls 3. In addition to providing a convenient means for applying pressure $P_2$ to the liquid, tube 25 also retains the liquid within the sensor. A meniscus is formed within the tube by the surface tension of the liquid to prevent the liquid from flowing out of the sensor. Thus, there is no need for a diaphragm or bellow as required in the prior art and the spring rate error resulting therefrom is eliminated.

Thus, the present invention provides a pressure sensor for sensing absolute or differential pressure. The sensor is nonsensitive to acceleration and is not effected by humidity or temperature variations. The sensor provides accuracies that were not heretofore available and has substantially improved reliability because it has no moving parts subject to wear.

What is claimed is:

1. A device for measuring pressure, comprising:
   an outer quartz member having an opening therethrough;
   a pair of quartz elements each having an end wall and a sidewall and disposed in said opening of the outer member with the end walls spaced from and opposing one another and with at least a portion of the sidewalls heat sealed to the outer member;
   means for subjecting the end walls to the pressure to be measured to flex the end walls; and
   means for measuring flexure of the end walls and providing an output corresponding to the pressure.

2. A device as described in claim 1 wherein the sidewall of each element is cylindrical and the end wall is circular.

3. A device for measuring pressure, comprising:
   an outer member having an opening therethrough;
   a pair of elements each having an end wall and a sidewall and disposed in said opening of the outer member with the end walls spaced from and opposing one another and with at least a portion of the sidewalls secured to the outer member;
   means for subjecting the end walls to the pressure to be measured to flex the end walls;
   capacitor plates formed on opposing surfaces of the end walls to form a capacitor providing an output for measuring flexure of the end walls and corresponding to the pressure;
   seals formed in the sidewall of each element; and
   conductors connected to the capacitor plates and extending through the seals.

4. A device as described in claim 3, wherein each seal comprises a tube formed on the sidewall and having an opening therethrough for passing the conductor, said opening being heat sealed.

5. A device as described in claim 3, wherein the capacitor plates comprise a coating of conductive material.

6. A device for measuring pressure comprising:
   an outer member having an opening therethrough;
   a pair of elements each having an end wall and a sidewall and disposed in said opening of the outer member with the end walls spaced from and opposing one another and with at least a portion of the sidewalls secured to the outer member;
   means for subjecting the opposing surfaces of the end walls to a first pressure including an outwardly extending tube formed on the outer member and having an opening extending therethrough to a space between the opposed surfaces of the end walls, a capillary tube having a first end connected to the outwardly extending tube and the first pressure being applied to a second end of the capillary tube; and a liquid having a stable dielectric constant contained in the space between the elements and in a portion of the capillary tube so that the first pressure is exerted on the opposing surfaces of the end walls through the liquid and the liquid is retained within the device by a meniscus formed in the capillary tube;

means for subjecting the other surface of each end wall to a second pressure; and means for measuring flexure of the end walls and providing an output corresponding to the difference between the first and second pressures.

7. A device as described in claim 6, wherein the elements have side walls having a height substantially equal to one half the width of the end walls.

8. A device as described in claim 6, wherein the side walls are secured to the outer member at a distance from the end walls equal to one half the width of the end walls.

9. A device for sensing the difference between a first and a second pressure, comprising:
   a hollow member having at least one flexible wall and an opening to the interior thereof;
   a capillary tube connected to said opening for applying the first pressure to the interior of the member so that the first pressure is applied to an inner surface of the flexible wall;
   means for applying the second pressure to an outer surface of the flexible wall so that the wall flexes an amount corresponding to the difference between the first and second pressures;
   capacitor means having plates mounted within the hollow member for providing an output corresponding to the flexure of the flexible wall which also corresponds to the difference between the first and second pressures; and
   a liquid having a stable dielectric constant contained within the hollow member and a portion of the tube to maintain a constant dielectric between the plates of the capacitor, the capillary tube being arranged to retain the liquid in the device and providing for expansion and contraction of the liquid and changes in volume of the hollow member caused by flexures of the wall.

10. A device as described in claim 9, wherein two opposing walls are flexible and the capacitor means provides an output corresponding to the flexure of the opposing walls.

11. A device as described in claim 10, wherein the capacitor means comprises coatings of conductive material on the interior surface of each flexible wall, said coatings forming two capacitor plates.

12. A device as described in claim 10, wherein the hollow member is made of quartz.

13. A device as described in claim 9, wherein the hollow member is made of quartz.

14. A device for sensing a differential pressure, comprising:
   a pair of elements each having a flexible bottom wall and a sidewall;
   an outer member having an opening therethrough containing the elements positioned with their bottom walls opposed and spaced from each other, a portion of each side wall is secured to the outer member around the perimeter thereof to define an inner space between the elements and the outer member;
   a pair of capacitor plates formed on the opposed surfaces of the bottom walls forming a capacitor having a capacitance corresponding to the distance between the bottom walls;
   an outwardly extending tube formed on the outer member and having an opening extending therethrough to the inner space;
   a capillary tube connected to said opening for applying a first pressure to the inner space and to the opposed surfaces of the bottom walls;
   means for applying a second pressure to the other surfaces of the bottom walls so that the bottom walls flex in response to the pressures and the capacitance corresponds to the difference between the first and second pressures; and
   a liquid having a stable dielectric constant contained in the inner space and in a portion of the capillary tube for maintaining a constant dielectric between the capacitor plates, the capillary tube retains the liquid within the device and provides for changes in volume of the liquid and the inner space.

* * * * *